United States Patent [19]

Enomoto

[11] 4,441,799
[45] Apr. 10, 1984

[54] CAMERA WITH A LENS PROTECTIVE COVER

[75] Inventor: Fujio Enomoto, Hachioji, Japan

[73] Assignee: Olympus Optical Co., Ltd., Tokyo, Japan

[21] Appl. No.: 374,034

[22] Filed: May 3, 1982

[30] Foreign Application Priority Data

Jul. 1, 1981 [JP] Japan .................... 56-102472

[51] Int. Cl.³ .............................................. G03B 15/05
[52] U.S. Cl. .............................. 354/145.1; 354/195.1
[58] Field of Search .............. 354/126, 139, 145, 149, 354/195

[56] References Cited

U.S. PATENT DOCUMENTS

| 3,598,031 | 8/1971 | Harvey | 354/149 |
| 3,798,670 | 3/1974 | Tanaka |  |
| 4,181,415 | 1/1980 | Uchiyama et al. | 354/145 X |
| 4,189,222 | 2/1980 | Maitani | 354/126 |

FOREIGN PATENT DOCUMENTS 55-40463  3/1980  Japan .................... 354/145

Primary Examiner—John Gonzales
Attorney, Agent, or Firm—Weinstein & Sutton

[57] ABSTRACT

A camera with a lens protective cover includes switching means which turns a power supply of an electronic flash on to establish a flash photography mode for the camera, and a connection mechanism providing an operational connection between the switching means and the lens protective cover. When the lens protective cover is closed while the switching means assumes a position in which it establishes a flash photography mode, a movement of the cover causes the switching means to be automatically returned to a photographing mode other than the flash photography mode.

13 Claims, 3 Drawing Figures

CAMERA WITH A LENS PROTECTIVE COVER

BACKGROUND OF THE INVENTION

The invention relates to a camera with a lens protective cover, and more particularly, to a camera having a lens protective cover which is movable between a first position in which it covers the front surface of a taking lens and a second position in which the lens is exposed, and also adapted for use with an electronic flash which is either internally housed therein or detachably mounted thereon.

A camera is also known which has a lens protective cover movable between a first and a second position in which the front surface of a taking lens is covered and exposed, respectively. Also a camera of this type is known which is adapted to be used with an electronic flash that is either internally housed therein or detachably mounted thereon. A conventional camera of the type described may include switching means which turns a power switch of an electronic flash on to enable a flash photography mode. However, in the usual arrangement, the switching means is separate from and has no association with the lens protective cover, and this causes a difficulty that the flash photography mode is maintained to continue a charging of a main capacitor of the electronic flash even though the lens protective cover is closed to disable a photographing operation of the camera. The difficulty is even more aggravated when a member which operates the switching means is mounted on a camera body and is closed or covered by the lens protective cover whenever it is closed, since then the cover must be opened before the switching means is returned to a position which disables the flash photography mode.

A version of a camera of the type described is also known which automatically establishes a normal focus setting whenever the lens protective cover is opened. Such a camera affords a convenience that a picture can be taken without defocussing effect as a result of a mistaken distance adjustment, since the taking lens is focussed to a normal focus setting when the lens protective cover is opened for taking a picture. It is to be understood that a normal focus setting is selected to permit a picture to be taken with a degree of focussing effect upon any object being photographed which is located anywhere in the sight. In particular, an optimum focussing effect is achieved at an intermediate distance of 3 meters, for example, while the focussing effect is somewhat degraded for shorter distances. Accordingly, if a flash photography is attempted with such camera without performing any distance adjustment when the cover is opened, there is an increased likelihood that a picture would be taken in an out-of-focus condition because most objects being photographed are located at shorter distances than the intermediate distance, as will be evident from the fact that the flashlight from a usual electronic flash of a small size irradiates a range having a distance on the order of 3 to 4 meters. Thus, a flash photography must be made after performing a distance adjustment to a shorter distance, which is inconvenient.

A camera is also known including switching means which enables a flash photography and which is adapted to move the taking lens automatically to a shorter distance than the normal focus setting whenever the switching means is operated to enable a flash photography. A camera of this kind has a difficulty that when a picture is to be taken in a normal manner with the camera preset in its flash photography mode, a distance adjustment must be performed after returning the switching means to its normal photographing mode, thus resulting in a troublesome operation.

SUMMARY OF THE INVENTION

In view of the foregoing, it is an object of the invention to provide a camera with a lens protective cover in which when switching means which enables a flash photography is thrown to a position in which it establishes a flash photography mode, the switching means is automatically returned to a position which enables a normal photographing mode in interlocked relationship with a closing movement of a lens protective cover.

In accordance with the invention, a wasteful dissipation of a power supply battery which is contained in an electronic flash can be minimized if a user forgets to return the switching means to its position enabling a normal photographing mode, since the closure of the lens protective cover automatically returns the switching means to its normal photographing mode.

As the switching means is thrown to a position which establishes a flash photography mode, the taking lens is automatically moved to a focus setting which is suitable for use during a flash photography, thus minimizing the likelihood that pictures will be taken in an out-of-focus condition during such photography.

In addition, the closure of the lens protective cover when the camera is in its flash photography mode automatically turns off a power switch associated with an electronic flash and also automatically turns the taking lens to its normal focus setting position, thus again minimizing the likelihood that pictures will be taken in an out-of-focus condition as a result of forgetting to return the switching means.

DESCRIPTION OF PREFERRED EMBODIMENT

Figure 1:
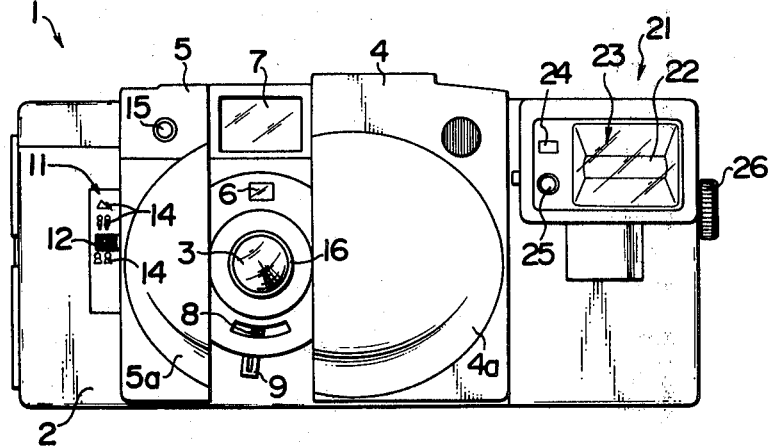
FIG. 1 is a front view of a camera with a lens protective cover according to one embodiment of the invention.

Referring to FIG. 1, the appearance of a camera with a lens protective cover according to one embodiment of the invention is shown. Camera 1 includes a body 2, and a taking lens 3 is disposed centrally in the front surface of the body 2. A lens protective cover 4 is movable between a first position in which it closes the taking lens 3 and another position in which it permits the taking lens 3 to be exposed. The lens protective cover 4 includes a front wall which is mounted on the right-hand half of the body 2 so that it is disposed in opposing relationship with the front surface of the body 2 to be slidable therealong while maintaining a parallel relationship therewith. The central portion of the front wall is shaped to define a semi-elliptical bulge 4a which projects forwardly in a semi-elliptical manner forwardly, beginning from its left-hand end, in order to avoid its abutment against a lens barrel 16 associated with the taking lens 3, which slightly projects from the front surface of the body 2, when the cover 4 is moved to its position where it covers the lens 3.

An abutment frame 5 is integrally formed with the body 2 at a location to the left of the taking lens 3 for abutment against the left-hand end face of the protective cover 4 whenever the latter has moved to its position closing the taking lens 3. The central portion of the abutment frame 5 similarly bulges forwardly in a left-hand semi-elliptical configuration, beginning from its right-hand end, so that the combination of the both bulges 5a and 4a forms an integral ellipsoid covering the taking lens 3.

It is to be understood that the lens protective cover 4 also covers a window 6 located above the taking lens 3 so as to receive light input for purpose of photometry, an objective window 7 for the finder which is located still above the window 6, a knob 8 which is used to preset film speed and is located below the taking lens 3, and another knob 9 located further below the knob 8 to enable a flash photography, in addition to the taking lens 3. When the protective cover 4 is moved to its position allowing the taking lens 3 to be exposed, the windows 6, 7 and the knobs 8, 9 are also exposed on the front side of the body 2.

A distance adjustment unit 11 is located to the left of the abutment frame 5 on the front surface of the body 2, toward the left-hand end thereof. The unit 11 includes a knob 12 which is used to establish a given focus setting for the taking lens 3, and three indicia 14 in the form of pictures or figures and indicative of three zone focus positions. It should be understood that these indices 14 are provided for a purpose of convenience only, and the knob 12 may be moved continuously through a range defined by the infinity, indicated by a chevron picture, to the nearest point, indicated by half figures, thus enabling a desired focus setting to be established.

In FIG. 1, numeral 15 indicates an indicator window which is utilized to indicate the operation of a self-timer and battery checker.

A devoted electronic flash 21 is detachably mounted on the right-hand sidewall of the camera 1, and has a vertically elongated rectangular configuration. Toward its top, the front surface of the electronic flash is provided with a light emitting window 23 associated with a flash discharge tube 22. Located to the left of the light emitting window 23 are a window 24 which is used to indicate film speed and another light receiving window 25 used for the purpose of photometry to cease or interrupt the emission of the flashlight automatically. The electronic flash 21 is provided with a mounting screw member, not shown, which extends horizontally therethrough. In a corresponding manner, the right-hand sidewall of the body 2 is formed with a threaded bore, not shown, into which the free end of the screw member may be threadably engaged to fix the electronic flash 21 on the camera 1. It is to be noted that the mounting screw member is integral with a fixing knob 26 which is mounted on the right-hand sidewall of the electronic flash 21 and which can be turned to control the threadable engagement of the screw member with the threaded bore.

Figure 2:
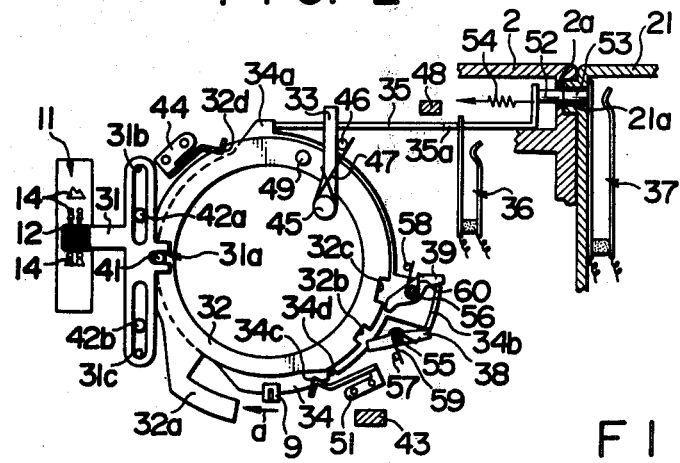
FIG. 2 is a fragmentary front view of the internal components of the camera shown in FIG. 1, principally illustrating a distance adjusting unit.

FIG. 2 shows the distance adjustment unit 11 including the knob 12, switching means including the knob 9 for enabling a flash photography, and a connection mechanism which provides a connection between the distance adjustment unit and the switching means.

Specifically, the distance adjustment unit includes a distance adjusting member 31 which integrally carries the knob 12 on its free end, a distance presetting ring 32 which is adapted to rotate as the member 31 moves in the vertical direction, and a normal focus return arm 33 which angularly drives the distance ring 32 to its position establishing a normal focal length in interlocked relationship with a closing movement of the lens protective cover 4. The switching means essentially comprises a flash enabling ring 34 fixedly carrying the knob 9, a flash interlocking member 35 adapted to move horizontally as the ring 34 rotates, a flash time limit switch 36 which is closed as the interlocking member 35 slides to a position where a flash photography is enabled, and a flash power switch 37. The connection mechanism essentially comprises a flash distance choosing lever 38 and a flash reset lever 39 having their one end engaged with the ring 34 and their other end engaged with the ring 32.

More specifically, the distance adjusting member 31 is in the form of a crisscross member, and the knob 12 is mounted on the free end of the left-hand horizontal limb thereof. The free end of the right-hand limb is formed with a fork 31a, which is engaged by an actuating pin 41 fixedly mounted on the front face of the distance presetting ring 32, toward a left-hand region thereof as shown. The upper and the lower vertical limb of the member 31 are formed with vertically elongate guide slots 31b, 31c, respectively, into which are fitted guide pins 42a, 42b, respectively, which are in turn fixedly mounted on a stationary member, not shown. Thus, by operating the knob 12, the distance adjusting member 31 is slidable up and down as a result of the cooperation between the slots 31b, 31c and pins 42a, 42b.

The distance presetting ring 32 is formed by an annular strip, and an L-shaped piece 32a extending from a point on the peripheral surface thereon, which is located near the bottom to the left thereof, as shown. The L-shaped piece 32a is adapted to be driven by a member 43, which is disposed below the lens protective cover 4 toward the rear side thereof and interlocked with the protective cover, to return the distance presetting ring 32 to a position where a normal focus setting is established. At a point on the peripheral surface which is located near the bottom and to the right thereof, the distance presetting ring 32 is formed with a notch 32b which is utilized to choose a photographing distance to be utilized during a flash photography, and another notch 32c is angularly spaced therefrom in the counterclockwise direction and is used to reset the flash photography. These notches 32b, 32c are engaged by one end of the flash distance choosing lever 38 and the flash reset lever 39 so as to angularly urge the distance presetting ring 32 toward a position where a desired photographing distance during a flash photography is established and another position corresponding to a normal focus setting. At a point on the peripheral surface which is located near the top and to the left, the distance presetting ring 32 is formed with a V-shaped notch 32d which defines a click stop. The purpose of notch 32d is to maintain the distance presetting ring 32 at a position corresponding to the normal focal length temporarily, by receiving the V-shaped end of a leaf spring 44 which is mounted on a stationary member, not shown. It is to be understood that the distance presetting ring 32 is provided with a drive member, not shown, which is connected to the taking lens 3 so as to move the taking lens 3 either forwardly or rearwardly along the optical axis as the ring 32 rotates.

The normal focus return arm 33 has its one end pivotally mounted on a pin 45 which is fixedly mounted on a stationary member, not shown, and is urged to rotate clockwise about the pin 45, by a torsion spring 47 disposed on the pin 45 and having its one end engaged with the arm 33 and its other end engaged with a stationary stop pin 46. However, the resulting angular movement of the arm 33 is normally constrained by the abutment of one side of the arm 33 against the stop pin 46. A portion of the normal focus return arm 33 which is adjacent to the free end thereof is adapted to be driven by another protective cover interlocking member 48, which is disposed above the lens protective cover 4 on the rear side thereof, to move counter-clockwise into abutment against a pin 49 fixedly mounted on the front surface of the distance presetting ring 32 near its top, thus returning the ring 32 to a position corresponding to the normal focal length.

The flash enabling ring 34 is formed by an annular plate, and is disposed in coaxial relationship with the distance presetting ring 32 at a position rearwardly thereof, and fixedly carries the knob 9 on its front surface toward the bottom thereof. A tab 34a projects upwardly from a point on the peripheral surface of the ring 34, located near the top thereof, for urging the flash interlocking member 35. An ear 34b extends diametrically outward from a point on the periphery of the flash enabling ring 34, which is located on the right-hand side and slightly below a median point thereon, and has its free end folded to extend in the forward direction for engagement with one end of the both levers 38, 39. A pair of angularly spaced notches 34c, 34d are formed in the peripheral surface of the flash enabling ring 34 toward the bottom and to the right thereof to provide a click stop action. These notches 34c, 34d are adapted to be engaged by the V-shaped end of a leaf spring 51 which is mounted on a stationary member, not shown, thus temporarily locking the flash enabling ring 34 at its positions which establish a normal photographing mode and a flash photography mode, respectively.

The flash interlocking member 35 is formed by a horizontally slidable rod, carrying a lug 35a to close the flash time limit switch 36 intermediate its length. The switch 36 is closed during a flash photography, thus controlling the speed of operation of a shutter, not shown, to a given time period during a flash photography. It will be noted that the right-hand end of the flash interlocking member 35 is folded to extend upwardly, and fixedly carries an actuator 52 on its right-hand side which is operative to close the flash power switch 37, which is disposed within the electronic flash 21. The actuator 52 extends through an opening 2a formed in the right-hand sidewall of the body 2 and is located opposite to an actuated member 53 which is fixedly mounted on one of movable contacts of the flash power switch 37 of the electronic flash. This movable contact has a resilience which causes the contact to be located opposite to the actuator 52 and to extend into an opening 21a. The power switch 37 is closed during a flash photography, thus allowing a main capacitor, not shown, of the electronic flash 21 to begin charging. The flash interlocking member 35 is engaged by one end of a coiled tension spring 54 of a reduced resilience, which urges it to be pulled to the left. However, the resulting sliding movement of the interlocking member 35 is limited by the abutment of the left-hand end face thereof against the tab 34a of the flash enabling ring 34.

The both levers 38, 39 are pivotally mounted on pins 55, 56, both of which are fixedly mounted on a stationary member, not shown, and are urged to rotate counter-clockwise and clockwise, respectively, about the respective pins 55, 56, respectively, by torsion springs 59, 60 disposed on these pins and having their one end engaged with their respective levers 38, 39 and the other end bearing against stationary stop pins 57, 58. However, the resulting rotation of the levers 38, 39 is limited by the abutment of one end of these levers against the connecting piece or the right-hand end of the ear 34b.

In operation, before taking a picture, the lens protective cover 4 is initially moved from its closed position to the right or to its open position shown in FIG. 1. Then, the taking lens 3 is exposed through the front of the body 2. It will be seen that the taking lens 3 is then adjusted to the normal focus setting since the lower protective cover interlocking member 43 has been engaged with the L-shaped piece 32a while the upper protective cover interlocking member 48 has been held in abutment against the pin 49 through the normal focus return arm 33 interposed, before the cover 4 is opened. Accordingly, various parts assume positions indicated in FIG. 2. The camera is substantially properly focussed upon most objects being photographed under this condition, and therefore a picture can be taken without requiring an additional distance adjustment. However, if it is desired to achieve a better focussing upon an intended object being photographed, the knob 12 may be operated to bring it into alignment with a desired one of the indicia 14. As the knob 12 is operated, the distance adjusting member 31 moves either up or down, causing the actuator pin 41 to rotate the distance presetting ring 32, thus achieving a distance adjustment of the taking lens 3. Thereupon, a shutter release button, not shown, may be depressed to take a picture. When moving the knob 12 from its position corresponding to an intermediate distance (for example, 3 meters) which represents the normal focal length, the spring 44 is disengaged from the notch 32d, but the V-shaped end of the spring 44 bears against the peripheral surface of the distance presetting ring 32, thus effectively preventing any unintended movement of the ring 32.

Figure 3:
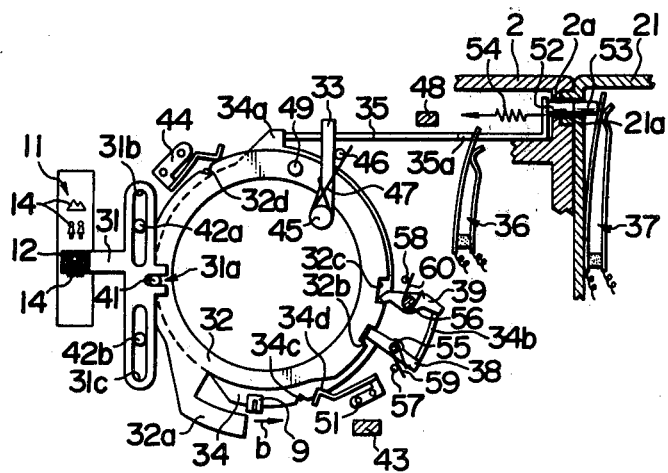
FIG. 3 is a similar view to FIG. 2, illustrating the operative condition of the distance adjusting unit.

When a flash photography is desired with the camera of the invention, the knob 9 is moved to the left, as indicated by an arrow a. Then the flash enabling ring 34 rotates clockwise as indicated in FIG. 3, whereby the flash interlocking member 35 slides to the right as it is pushed by the tab 34a, thus allowing the lug 35a to turn the switch 36 on while the actuator member 52 acts through the member 53 to turn the power switch 37 of the electronic flash on. Accordingly, a charging of the main capacitor is initiated within the electronic flash 21. Clockwise rotation of the flash enabling ring 34 causes the flash distance choosing lever 38 to be driven clockwise through the connecting piece 34b, whereby its other end moves into the notch 32b to bear against the inner, upper wall thereof, whereby the distance presetting ring 32 is driven counter-clockwise. As a consequence, the taking lens 3 is adjusted to a position corresponding to a flash photography distance of 2 meters, for example, which is substantially midway between the intermediate distance and the nearest point. This movement of the ring 32 acts through the actuator pin 41 to move the distance adjusting member 31 slightly downward, whereby the knob 12 assumes a position intermediate the whole figures and half figures of the indicia 14.

As the connecting piece 34b moves, the flash reset lever 39 is allowed to rotate clockwise under the resilience of the spring 60, whereby its other end moves into the notch 32c where it comes to a stop. The rotation of the flash enabling ring 34 allows the V-shaped end of the leaf spring 51 to snap from the notch 34c to the notch 34d, thus temporarily locking the flash enabling ring 34 at a position which enables a flash photography. Thus, the depression of a shutter release button after the completion of charging of the electronic flash 21 is all that required to provide a properly focussed photograph of almost any object being photographed which is located within the extent of irradiation of the flashlight.

When returning the camera of the invention to its normal photographing mode, the knob 9 may be moved to the right as indicated by an arrow b. This causes the flash enabling ring 34 to rotate counter-clockwise, whereby the tab 34a moves to the left, allowing the flash interlocking member 35 to move to the left under the resilience of the spring 54. Thus, the switch 36 is turned off by its own resilience as is the power switch 37. Accordingly, the electronic flash 21 ceases to charge the main capacitor. At the same time, the rotation of the flash enabling ring 34 causes the connecting piece 34b to drive one end of the flash reset lever 39 to turn it counter-clockwise. Thereupon, the other end of the lever 39 bears against the lower wall of the notch 32c to drive the distance presetting ring 32 clockwise through a small stroke. This returns the taking lens 3 to its position where the normal focal length is established, and also causes the actuator pin 41 to raise the distance adjusting member 31 slightly upward, whereby the knob 12 returns to a position in which it is aligned with the whole figures of the indicia 14. The flash distance choosing lever 38 follows the movement of the connecting piece 34b and rotates counter-clockwise under the resilience of the spring 59, whereby its other end is retracted from the notch 32b where it remains stationary. The leaf spring 51 causes the V-shaped end thereof to engage the notch 34c, thus temporarily maintaining the flash enabling ring 34 at a position corresponding to the normal photographing mode. In this manner, the camera 1 resumes the condition illustrated in FIG. 2.

In a conventional camera with a lens protective cover, if the lens protective cover is closed while the flash photography enabling knob is moved to its position which establishes a flash photography, the flash photography mode remains effective and hence the electronic flash continues the charging. However, in the camera with a lens protective cover of the invention, the closure of the lens protective cover 4 automatically terminates the flash photography mode. Specifically, when the lens protective cover 4 is closed under the condition shown in FIG. 3 which establishes the flash photography mode, the lower protective cover interlocking member 43 bears against the L-shaped piece 32a to drive the distance presetting ring 32 and taking lens 3 slightly clockwise. This motion is transmitted through the actuator pin 41 to raise the distance adjusting member 31 slightly until the knob 12 is aligned with the whole figures of the indicia 14. Simultaneously, the inner upper wall of the notch 32b drives the other end of the flash enabling lever 38 to rotate counter-clockwise. Such rotation of the lever 38 causes the connecting piece 34b, which engages the opposite end thereof, to cause the flash enabling ring 34 to rotate counter-clockwise. In this manner, the knob 9 which is used to establish a flash photography is automatically returned to its position corresponding to the normal photographing mode, and simultaneously the flash interlocking member 35 follows the tab 34a to move to the left under the resilience of the spring 54, thus turning the both switches 36, 37 off. It will thus be seen that the flash photography mode is terminated in response to the closure of the a lens protective cover 4.

In the camera with lens protective cover of the invention, if it is attempted to move the knob 9 to its position which establishes a flash photography under the condition that the taking lens is focussed to a focus setting other than the normal focal length, the location of the notch 32b out of an extent of rotation of the flash distance choosing lever 38 causes the adjacent end of the lever 38 to bear against the peripheral surface of the distance presetting ring 32, thus preventing the lever 38 from rotating. In other words, a transfer to the flash photography mode is enabled in the camera 1 of the invention only when the taking lens is focussed to the normal focal length, thus providing a camera which minimizes the likelihood that an inadvertent operation of the knob 9 results in a flash photography being performed. This effectively prevents an adverse operation that a flash photography may be performed under the condition that the taking lens is focussed to infinity, which cannot be irradiated by the flashlight.

What is claimed is:

1. A camera with a lens protective cover which is movable between a first position in which it covers the front side of a taking lens and a second position in which it permits the taking lens to be exposed, the camera being adapted to utilize an electronic flash which is either internally housed therein or detachably mounted thereon, by comprising:

switching means for turning on a power supply of an electronic flash to establish a flash photography mode;

a connection mechanism for returning the switching means to a position other than the flash photography mode in interlocked relationship with the movement of the lens protective cover as the latter is closed when the switching means is left in a position establishing a flash photography mode; and said switching means being connected through said connection mechanism to a distance adjustment unit associated with said taking lens in a manner such that whenever said switching means assumes a position in which a flash photography mode is established, said taking lens is automatically focused to a focus setting suitable for flash photography.

2. A camera according to claim 1 further including a distance adjustment unit which includes a normal focus return mechanism which automatically returns the taking lens to a position corresponding to its normal focus setting in interlocked relationship with the closing movement of the lens protective cover, and wherein when the lens protective cover is closed when the switching means is left in a position which establishes a flash photography mode, the switching means is switched to a position which disables the flash photography mode and the taking lens is automatically returned to a position corresponding to the normal focus setting.

3. A camera according to claim 1 in which the coupling between the connection mechanism and the distance adjustment unit is enabled only when the taking lens is focussed to the normal focus setting and in which when the taking lens is focussed to a focus setting other than the normal focus setting, the distance adjustment unit constrains the operation of the connection mechanism, thus preventing the switching means from moving to a position which establishes the flash photography mode.

4. A camera according to claim 1 in which the switching means essentially comprises a manual knob which is utilized to establish a flash photography mode, a flash enabling ring integrally carrying the knob thereon, a flash interlocking member disposed for sliding movement as the flash enabling ring rotates, and a combination of a flash period choosing switch and a flash power switch, both of which are closed as the flash interlocking member moves to a position corresponding to the flash photography mode.

5. A camera according to claim 1 in which the connection mechanism essentially comprises a flash distance choosing lever and a flash reset lever each having their one end engaged with a flash enabling ring associated with the switching means and having their other end engaged with a distance presetting ring of the distance adjustment unit.

6. A camera according to claim 1 in which the distance adjustment unit essentially comprises a manual knob which is utilized to provide an adjustment of a photographing distance, a distance adjusting member integrally carrying the knob thereon, and a distance presetting ring disposed for rotation as the distance adjusting member moves.

7. A camera according to claim 2 in which the normal focus return mechanism essentially comprises a protective cover interlocking member which is integrally formed on the lens protective cover, and a driven piece and a normal focus return arm which are driven by the protective cover interlocking member to rotate a distance presetting ring of the distance adjustment unit to a position which establishes the normal focus setting.

8. A camera according to claim 5 in which the other end of the flash distance choosing lever is engaged with a notch formed in the periphery of the distance presetting ring, and whenever the distance presetting ring assumes a position corresponding to a focus setting other than the normal focus setting, the notch is located out of a path of rotation of the flash distance choosing lever, whereby an operation of the switching means results in the other end of the flash distance choosing lever abutting against the outer peripheral surface of the distance presetting ring, thus preventing the switching means from assuming a position which establishes the flash photography mode.

9. A camera according to claim 5 in which the other end of the flash reset lever is engaged with a notch formed in the periphery of the distance presetting ring so as to be angularly driven by the flash enabling ring as the latter assumes a position corresponding to other than the flash photography mode, thus causing the notch to rotate the distance presetting ring to return the taking lens to a position corresponding to the normal focus setting.

10. A camera with a lens protective cover which is movable between a first position in which it covers the front side of a taking lens and a second position in which it permits the taking lens to be exposed, the camera being adapted to utilize an electronic flash, comprising:

switching means for turning on and off a power supply of an electronic flash for controlling a flash photography mode, and moving means operatively connected to said switching means for moving said taking lens between a focus setting for said flash photography mode and a focus setting for nonflash photography; and means cooperating with said lens protective cover moving to said first position for driving said moving means to move said switching means to a position other than said flash photography mode, and for turning off said power supply for said electronic flash, and for moving said taking lens to a position corresponding to a normal focus setting.

11. A camera having a distance adjustment unit which presets a focus setting suitable for photography and which is tentatively locked at a normal focus setting, comprising:

a flash photography switching member movably mounted on a camera body in such a manner that a power source for an electronic flash unit mounted on the camera or built-in the camera can be turned on or off; and a connection mechanism which permits a movement of said switching member to turn on said power source when a distance adjustment member is at the normal focus setting and which prevents the movement of said switching member when said distance adjustment member assumes a position other than the normal focus setting by causing said switching member and said distance adjustment member to be in interlocked relationship to move the latter from a normal focus setting to a focus setting for a flash photography.

12. A camera with a lens protective cover which is movable between a first position in which it covers the front side of a taking lens and a second position in which it permits the taking lens to be exposed, the camera being adapted to utilize an electronic flash, comprising:

switching means for turning on a power supply of an electronic flash to establish a flash photography mode, said switching means comprising a flash-enabling ring for establishing said flash photography mode and a flash interlocking member disposed for movement as said flash-enabling ring rotates, said flash interlocking member being operative to turn on said power supply of said electronic flash;

moving means for moving said taking lens to a focus setting for said flash photography mode; and means cooperating with said lens protective cover moving to said first position for moving said moving means to move said taking lens to a position corresponding to a normal focus setting, and for moving said switching means to a position other than said flash photography mode, and for moving said flash interlocking member to a position for turning off said power supply for said electronic flash.

13. A camera in accordance with claim 12 wherein said means cooperating with said lens protective cover includes a connection mechanism between said moving means for moving said taking lens and said switching means.

* * * * *